(12) United States Patent
Lin

(10) Patent No.: US 8,911,077 B2
(45) Date of Patent: Dec. 16, 2014

(54) EYEGLASSES WITH REPLACEABLE LENSES

(71) Applicant: China-Star Worldwide Corp., Tainan (TW)

(72) Inventor: Hsu-Nan Lin, Tainan (TW)

(73) Assignee: China-Star Worldwide Corp., Tainan (TW)

( * ) Notice: Subject to any disclaimer, the term of this patent is extended or adjusted under 35 U.S.C. 154(b) by 0 days.

(21) Appl. No.: 13/886,403

(22) Filed: May 3, 2013

(65) Prior Publication Data

US 2014/0327872 A1 Nov. 6, 2014

(51) Int. Cl.
*G02C 1/04* (2006.01)

(52) U.S. Cl.
CPC .......................................... *G02C 1/04* (2013.01)
USPC .......................................... 351/106; 351/103

(58) Field of Classification Search
CPC ........ G02C 1/04; G02C 1/02; G02C 2200/08; G02C 1/06; G02C 1/08
USPC ........... 351/106, 103, 41, 105, 107, 108, 109, 351/86, 83
See application file for complete search history.

(56) References Cited

U.S. PATENT DOCUMENTS

| | | | |
|---|---|---|---|
| 6,863,395 B1 * | 3/2005 | Teng | 351/103 |
| 7,222,958 B1 * | 5/2007 | Chiou | 351/103 |
| 7,497,569 B2 * | 3/2009 | Webb | 351/106 |
| 8,430,506 B2 * | 4/2013 | Chen | 351/103 |

* cited by examiner

*Primary Examiner* — Hung Dang
(74) *Attorney, Agent, or Firm* — Rosenberg, Klein & Lee

(57) ABSTRACT

A pair of eyeglasses includes a front having two semi-rims and two temples are pivotably connected to outsides of the two semi-rims. Each semi-rim has a groove defined in the inside thereof and a slot is defined in an outside thereof. Two lenses each have a protrusion protruding from the inside thereof, the protrusion is engaged with the groove. A notch is defined in the inside of each lens. Two locking devices are respectively located in the two slots of the two semi-rims, and each locking device is locked with the notch to secure the lens to the semi-rim. Each locking device has a switch member and the lens is disengaged from the semi-rim by shifting the switch member.

1 Claim, 4 Drawing Sheets

EYEGLASSES WITH REPLACEABLE LENSES

BACKGROUND OF THE INVENTION

1. Fields of the Invention

The present invention relates to a pair of eyeglasses, and more particularly, to a pair of eyeglasses with replaceable lenses by shifting a switch member.

2. Descriptions of Related Art

The conventional eyeglasses comprise a front with two lenses secured in the two rims, the lenses cannot be replaced easily. However, some eyeglasses such as the safety goggles may need to replace lenses frequently, so that the conventional eyeglasses cannot meet their needs. Therefore, the eyeglasses with replaceable lenses are developed.

The conventional eyeglasses with replaceable lenses comprise a front with two rims and a bridge is connected between the two rims. Two temples are respectively and pivotably connected to the two rims. Two protrusions respectively extend from two ends of the bridge so as to be connected to the two rims. Each rim has a first magnet located at the outside thereof. Each lens has a notch located close to the bridge and a second magnet is located on the outside of each lens. The protrusions are engaged with the two respective notches of the two lenses which are engaged with the gap between the bridge and the rims. The first and second magnets are attracted to each other so as to position the lenses to the rims.

Each lens has the outside thereof positioned by the connection between the first and second magnets. However, the first and second magnets are two small magnets which are easily separated from each other by impact and the lenses easily drop when replacing the lenses. Besides, the magnetic force may fade off along with the time of use.

The present invention intends to provide a pair of eyeglasses with replaceable lenses to improve the shortcomings mentioned above.

SUMMARY OF THE INVENTION

The present invention relates to a pair of eyeglasses and comprises a front having two semi-rims and two temples are pivotably connected to outsides of the two semi-rims. Each semi-rim has a groove defined in the inside thereof and a slot is defined in an outside thereof. Two lenses each have a protrusion protruding from the inside thereof, the protrusion is engaged with the groove. A notch is defined in the inside of each lens. Two locking devices are respectively located in the two slots of the two semi-rims, and each locking device is locked with the notch to secure the lens to the semi-rim.

Preferably, each of the locking devices has a switch member and a resilient member. The switch member has an engaging portion which is engaged with the notch. A chamber is defined in the central portion of each switch member and the resilient member is located in the chamber. A bolt extends through the chamber, the pivotal hole defined in a protrusion on the temple and is connected to the semi-rim. When the switch member is shifted to compress the resilient member, the engaging portion is disengaged from the notch so that the lens is removed from the semi-rim rim.

The locking device secures the lens to the semi-rim and the bolt secures the switch member to the semi-rim. By shifting the switch member to compress the resilient member, the lens can be easily secure with or removed from the semi-rim.

The primary object of the present invention is to provide a pair of eyeglasses wherein the lenses can be easily installed to and removed from the semi-rims.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
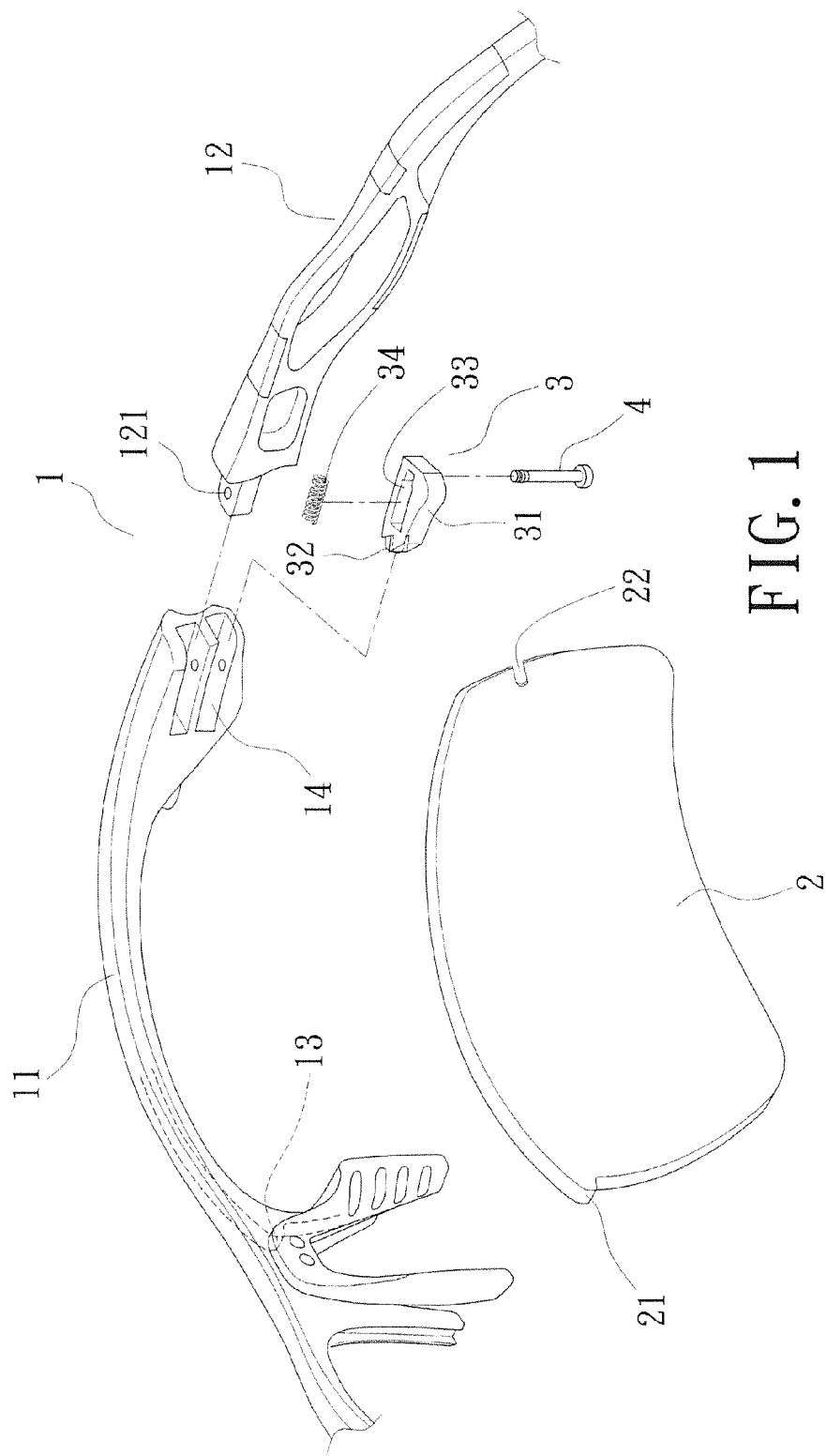
FIG. 1 is an exploded view to show the pair of eyeglasses of the present invention.
Figure 2:
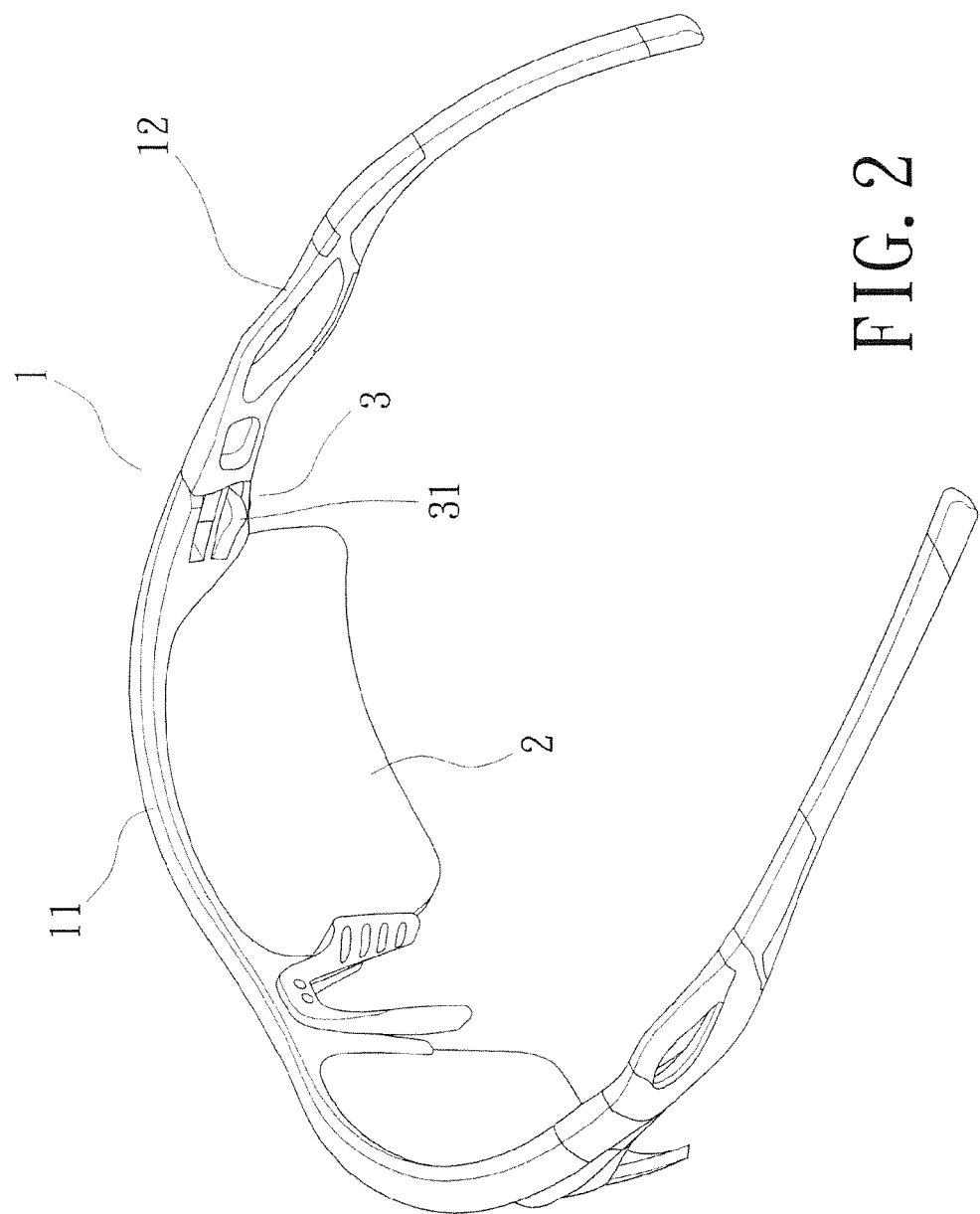
FIG. 2 is a perspective view to show the pair of eyeglasses of the present invention.
Figure 3:
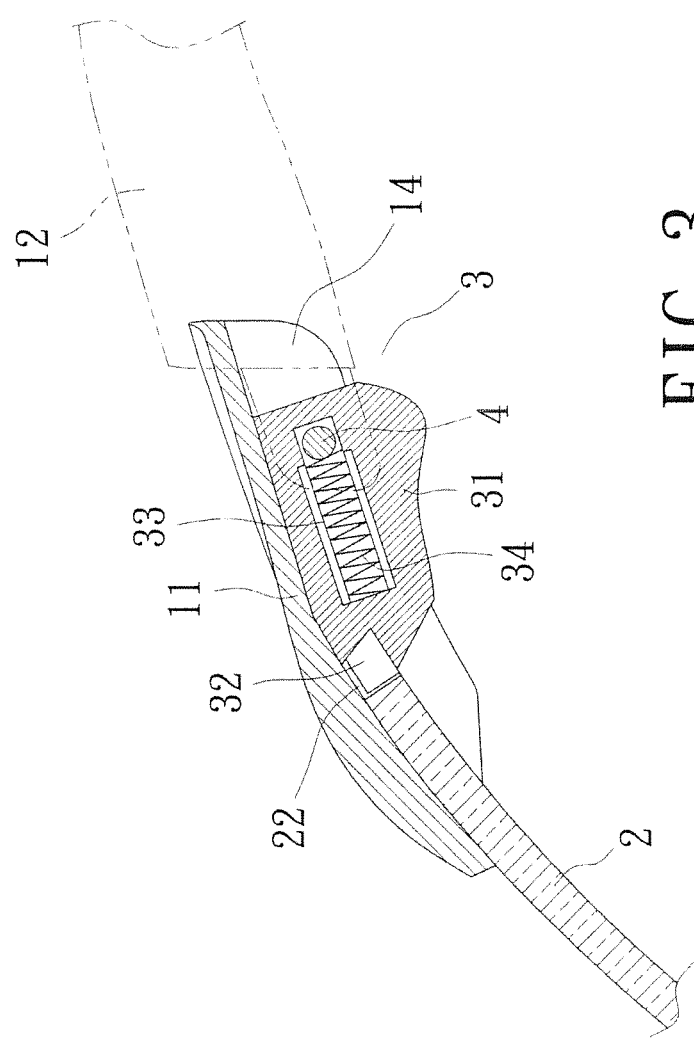
FIG. 3 is a cross sectional view to show the locking device connecting the lens to the semi-rim of the eyeglasses of the present invention.

Referring to FIGS. 1 and 2, the eyeglasses of the present invention comprise a front 1 having two semi-rims 11 and two temples 12 are pivotably connected to two respective outsides of the two semi-rims 11. Each semi-rim 11 has a groove 13 defined in the inside thereof and a slot 14 is defined in the outside of each semi-rim 11.

Two lenses 2 each have a protrusion 21 protruding from the inside thereof, the protrusion 21 is engaged with the groove 13. A notch 22 is defined in the inside of each lens 2.

Two locking devices 3 are respectively located in the slots 14 of the two semi-rims 11, and each locking device 3 is locked with the notch 22 to secure the lens 2 to the semi-rim 11.

When in assembling, as shown in FIGS. 1 to 4, the two lenses 2 are engaged with the two semi-rims 11. Each lens 2 has a protrusion 21 protruding from the inside thereof so as to be engaged with the groove 13 of the semi-rim 11. The notch 22 of the lens 2 connected with the locking device corresponding thereto.

Each of the locking devices 3 has a switch member 31 and a resilient member 34. The locking device 3 is located in one of the two slots 14 of each semi-rim 11 and the switch member 31 has an engaging portion 32 which is engaged with the notch 22. A chamber 33 is defined in the central portion of each switch member 31 and the resilient member 34 is located in the chamber 33. A bolt 4 extends through the chamber 33, the pivotal hole 121 defined in a protrusion on the temple 12 and is connected to the semi-rim 11. The protrusion of each temple 12 is located in the other slot 14 of each semi-rim 11. When the switch member 31 is shifted to compress the resilient member 34, the engaging portion 32 is disengaged from the notch 22 so that the lens 2 is removed from the semi-rim 11.

Figure 4:
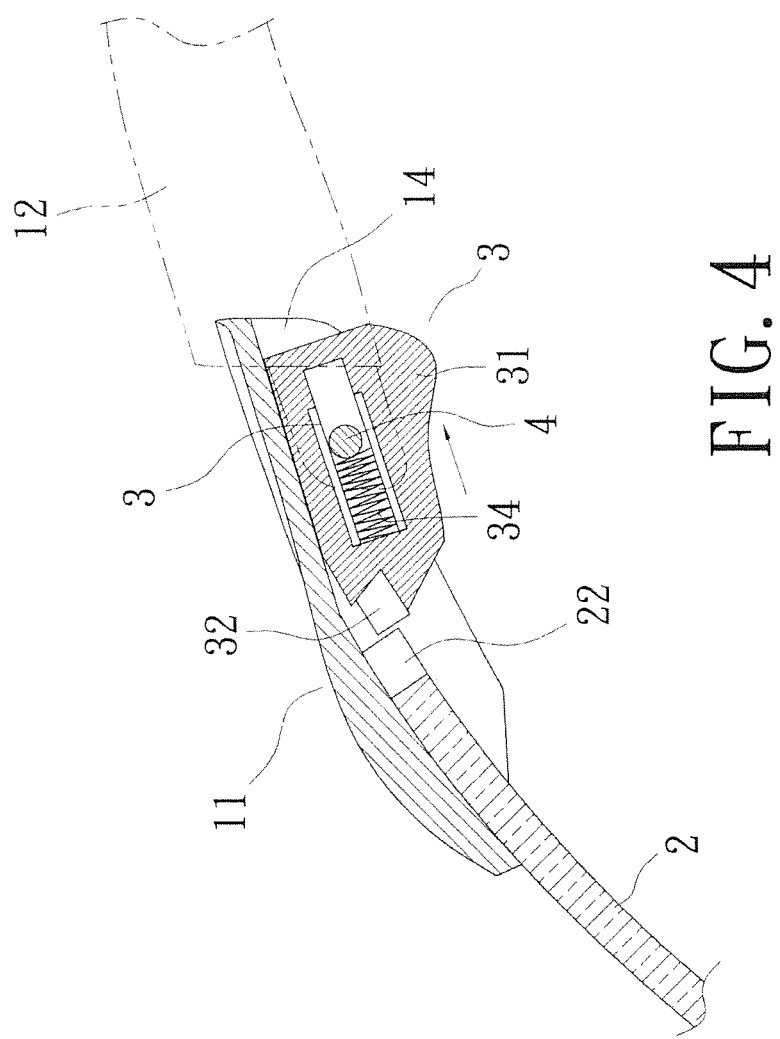
FIG. 4 is a cross sectional view to show that the switch member is shifted to compress the resilient member to release the lens from the semi-rim of the eyeglasses of the present invention.

As shown in FIG. 4, when shifting the switch member 31, the resilient member 34 is compressed which moves the engaging portion 32 from the notch 22 of the lens 2. Therefore the lens 2 can be easily removed from the semi-rim 11. When installing the lens 2, the protrusion 21 of the lens 2 is engaged with the groove 13 of the semi-rim 11. The switch member 31 is released to let the resilient member 34 move the engaging portion 32 to be engaged with the protrusion 32 of the lens 2, so that the lens 2 is secure in the semi-rim 11.

The present invention provides the locking device 3 which is easily operated to secure or release the lens 2 relative to the semi-rim 11, so that the users can easily replace the lenses 2.

While we have shown and described the embodiment in accordance with the present invention, it should be clear to those skilled in the art that further embodiments may be made without departing from the scope of the present invention.

What is claimed is:

1. A pair of eyeglasses comprising:

a front having two semi-rims and two temples pivotably connected to outsides of the two semi-rims, each semi-rim having a groove defined in an inside thereof and a slot defined in an outside thereof;

two lenses each having a protrusion protruding from an inside thereof, the protrusion engaged with the groove, a notch defined in an inside of each lens; and two locking devices respectively located in the two slots of the two semi-rims, each locking device locked with the notch to secure the lens to the semi-rim;

wherein each of the locking devices has a switch member and a resilient member, the switch member has an engaging portion which is engaged with the notch, a chamber is defined in a central portion of each switch member and the resilient member is located in the chamber, a bolt extends through the chamber, the pivotal hole defined in a protrusion on the temple and is connected to the semi-rim, when the switch member is shifted to compress the resilient member, the engaging portion is disengaged from the notch so that the lens is removed from the semi-rim.

* * * * *